United States Patent Office 3,346,396
Patented Oct. 10, 1967

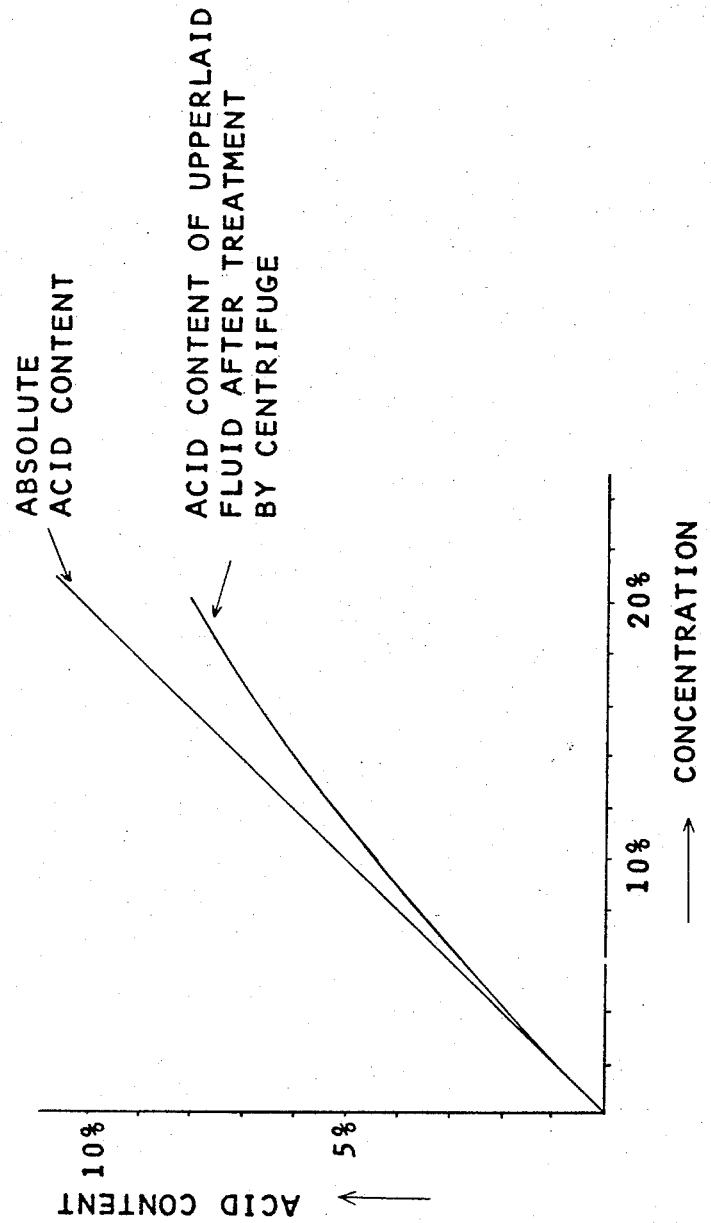

3,346,396
REACTION PRODUCT OF SODIUM GLUTAMATE AND ACETIC ACID AS A DRY ACID SEASONING
Akira Kitayama, Sakai, Japan, assignor to Tamanoi Su Kabushiki Kaisha, Sakai, Japan, a corporation of Japan
Filed Apr. 22, 1965, Ser. No. 450,072
Claims priority, application Japan, Oct. 22, 1964, 39/60,198
2 Claims. (Cl. 99—140)

ABSTRACT OF THE DISCLOSURE

A dry, acid seasoning for foods consisting essentially of the reaction product of a concentrated acetic acid containing liquid and sodium glutamate wherein about 3 mols of acetic acid is reacted with about 1 mol of sodium glutamate.

In preparing foods, various organic acids, such as acetic acid and lactic acid, as liquids, or tartaric acid, malic acid, succinic acid and fumaric acid, as solids, have hitherto been employed as acidulants. Among these, acetic acid has become the most familiar to the taste of human beings, principally in the various forms of vinegar. As acetic acid itself cannot be solidified by conventional procedures, it is not available except as a solution.

One of the objects of this invention is therefore to provide a dry, acetic acid seasoning and a food product containing such seasoning whereby to facilitate transportation, storage and handling.

Another object of this invention is to provide a dry, acid seasoning that contains MSG and acetic acid.

Another object of the invention is to provide a dry, acetic acid seasoning that does not, of necessity, contain any additional flavoring substances.

Another object of the invention is to provide a dry, acetic acid seasoning which is chemically stable.

In use, the dry acid seasoning of the invention may be mixed with other seasonings or flavorings or with an appropriate liquid to form a fluid condiment. It may also be added to foods either directly or after mixing into such a fluid condiment.

The term "acetic acid containing liquid" is used herein to refer to glacial acetic acid, distilled vinegar, or synthetic vinegar.

The principal feature of this invention resides in the solidification reaction of acetic acid and MSG. More specifically, 1 mol of acetic acid is first reacted with 1 mol of MSG whereby to form 1 mol of glutamic acid and 1 mol of sodium acetate as follows:

$$C_5H_8NNaO_4 + C_2H_4O_2 \rightarrow C_5H_9NO_4 + C_2H_3O_2Na \quad (1)$$

The sodium acetate coming into existence by the reaction of Equation 1 is capable of reacting with 2 mols of acetic acid, as follows:

$$C_2H_3O_2Na + 2C_2H_4O_2 \rightarrow CH_3COONa \cdot 2CH_3COOH \quad (2)$$

The reactions of Equation 1 and 2 occur successively, 1 mol of MSG reacting with 3 mols of acetic acid, as follows:

$$C_5H_8NNaO_4 + 3C_2H_4O_2 \rightarrow C_5H_9NO_4 + CH_3COONa \cdot 2CH_3COOH \quad (3)$$

The solid reaction product of Equation 3, namely $C_5H_9NO_4 + CH_3COONa \cdot 2CH_3COOH$ (hereafter simply referred to as A.G.), easily dissolves in water, as is shown in the accompanying drawing and the following table.

SOLUBILITY OF A.G. IN WATER AT 15° C.

| Concentration of A.G. (wt. percent) | Acetic Acid Content Calculated, Percent | Actual, Percent | Visual Condition of Mixture | Mixture After Centrifuging Supernatant Liquid | | |
|---|---|---|---|---|---|---|
| | | | | Acetic Acid Content, Percent | Dissolved A.G. (gms. per 100 c.c.) | Ppt. (gms. per 100 c.c.) |
| 1 | 0.51 | 0.51 | Clear | 0.51 | 1.01 | |
| 2 | 1.02 | 1.03 | do | 1.03 | 2.04 | |
| 5 | 2.55 | 2.55 | Faintly cloudy | 2.28 | 4.58 | 0.42 |
| 10 | 5.10 | 5.06 | Cloudy | 4.58 | 9.18 | 0.82 |
| 20 | 10.20 | 10.00 | do | 8.05 | 16.01 | 3.99 |

As shown in the drawing and the table, A.G. dissolves in excess water almost completely into acetic acid and MSG. Thus, at the levels in which acetic acid is normally used in foods, about 0.5% by weight, the degree of solubility of A.G. is no factor. At high concentrations of A.G., glutamic acid is precipitated and the aqueous solution turns cloudy.

In the attached drawing, the absolute acid content of A.G. water solutions at 15° C. and the acid content in the upperlaid (supernatant) fluid after treatment by centrifuge are shown vertically and the concentration of A.G. horizontally. It is clear that, with the increase of the concentration of A.G., the acid content of the upperlaid fluid after treatment by centrifuge increases almost directly proportionately.

The solubility of A.G. increases in a substantially straight line relationship upon heating and is about 70% at 100° C.

When dry A.G. is exposed to the atmosphere at a relative humidity of about 70% for 3 successive days, some acetic acid evaporates, but there is no observable change in the powdered state of the product. When A.G. is mixed with acetic acid and malic acid, the resulting material instantly deliquesces. A.G. alone is less deliquescent. When dry A.G. is heated to 150° C., acetic acid evaporates.

The reaction of Equation 3 is desirably caused to occur in a pasty state. Furthermore, the $CH_3COON_a$ moiety in Equation 3 is capable of becoming associated with three molecules of water of crystallization. Therefore, even if the product, A.G., contains about 10% water, its solid state is not impaired.

Specific examples of this invention are set forth below:

EXAMPLE I

When 16.9 kg. of MSG, after being well dried and powdered, is added to 18 kg. of glacial acetic acid with vigorous stirring, the mixture is pasty at first but its viscosity quickly increases. Within about 20 seconds, the mixture solidifies. This reaction occurs with the evolution of heat; and by carrying out the reaction in a water-cooled, jacketed kettle, the loss of acetic acid through evaporation, and the resultant presence of irritating vapors, is avoided. The solid produced by this reaction is readily pulverized to powder, grains, flakes or lumps which may be conveniently used as an acidulant in foodstuffs and food amendments. For instance, it may be used to make powdered vinegar, as follows:

|  | Kg. |
|---|---|
| Product of Example I | 1 |
| Tartaric acid | 5 |
| Malic acid | 1 |
| Succinic acid | 0.05 |
| Salt | 0.2 |

A powdered French dressing may be made as follows:

|  | Kg. |
|---|---|
| Product of Example I | 5 |
| Tragacenth gum | 1 |
| Spice | 0.5 |
| Sugar | 5 |
| Powdered tomatoes | 10 |
| Salt | 5 |
| Powdered fats | 5 |

EXAMPLE II

Distilled vinegar from apples, grapes, rice, alcohol, malt or the like is concentrated to about one tenth its original volume by means of freeze-drying and then, by treatment in a low-pressure, low-temperature evaporator (pressure: 25 mm. of Hg; temperature: 35° C.) is reduced to a pasty substance. This material is moistened with acetic acid which is added as flavoring. Sodium glutamate, fully dried and powdered, is mixed with the resulting product and stirred. At first the mixture is pasty, then it solidifies gradually, and finally it takes the shape of a block. This block is easily ground into powder, grains, flakes or lumps. Various flavorings are easily introduced at the time that the acetic acid material is mixed with the glutamate, or thereafter, in accordance with the following exemplary formulas:

*Formula 1.—Dry cider vinegar*

| Concentrated pasty substance of 100 litres of cider apple vinegar | litres | 2 |
|---|---|---|
| Glacial acetic acid | kg | 48 |
| MSG | kg | 50 |
| Tartaric acid | kg | 10 |
| Malic acid | kg | 10 |

*Formula 2.—Dry wine vinegar*

| Concentrated pasty substance of 100 litres of wine vinegar | litres | 2 |
|---|---|---|
| Glacial acetic acid | kg | 48 |
| MSG | kg | 50 |
| Tartaric acid | kg | 20 |

*Formula 3.—Dry tomato ketchup*

| Sugar | 1 |
|---|---|
| Salt | 0.5 |
| Powdered spice | 0.1 |
| Powdered tomatoes | 10 |
| MSG | 0.2 |
| Glacial acetic acid | 0.2 |

The specific examples herein shown and described are to be considered as being primarily illustrative. Various changes will, no doubt, occur to those skilled in the art; and such changes are to be understood as forming a part of this invention insofar as they fall within the spirit and scope of the appended claims.

What is claimed is:

1. A dry, acid seasoning for foods consisting essentially of the reaction product of a concentrated acetic acid containing liquid and sodium glutamate wherein about 3 mols of acetic acid is reacted with about 1 mol of sodium glutamate.

2. A food product comprising the acid seasoning of claim 1.

References Cited

UNITED STATES PATENTS

| 2,696,441 | 12/1954 | Kmieciak et al. | 99—147 |
| 2,893,874 | 7/1959 | Le Baron | 99—144 |

A. LOUIS MONACELL, *Primary Examiner.*

H. H. KLARE, *Assistant Examiner.*

UNITED STATES PATENT OFFICE
CERTIFICATE OF CORRECTION

Patent No. 3,346,396　　　　　　　　　　　　　　October 10, 1967

Akira Kitayama

It is hereby certified that error appears in the above numbered patent requiring correction and that the said Letters Patent should read as corrected below.

Column 4, lines 19 to 24, before each numeral insert -- kg --.

Signed and sealed this 12th day of November 1968.

SEAL)
Attest:

Edward M. Fletcher, Jr.　　　　　　　　　　　　EDWARD J. BRENNER
Attesting Officer　　　　　　　　　　　　　　　Commissioner of Patents